May 10, 1955     H. M. SULLIVAN, JR., ET AL     2,708,084
MOUNTING DEVICE

Filed Feb. 9, 1953     2 Sheets-Sheet 1

INVENTORS
H. M. SULLIVAN Jr.
W. H. ACKER
BY Hudson & Young
ATTORNEYS

# United States Patent Office 2,708,084
Patented May 10, 1955

2,708,084
MOUNTING DEVICE

Herbert M. Sullivan, Jr., and Warren H. Acker, Phillips, Tex., assignors to Phillips Petroleum Company, a corporation of Delaware Application February 9, 1953, Serial No. 335,894

2 Claims. (Cl. 248—20)

This invention relates to a mounting device particularly adapted for supporting a pump or other heavy apparatus.

Heretofore, considerable difficulty has been experienced in providing suitable supports for heavy apparatus, such as motor-pump units, compressors, and the like. In oil refineries, pumps have suction and discharge lines which oftentimes carry fluids at high temperaures, and these lines have horizontally and vertically extending portions which expand and contract as the hot fluids are passed therethrough, and the flow of such materials is stopped. The resulting horizontal and vertical forces mechanically transmitted to the pump by the suction and discharge lines are of considerable magnitude and are capable of damaging a rigid pump mounting. Further, due to the uneven distribution of weight on the frame or bed plate supporting the pump, difficulties are encountered in maintaining the support accurately in a level position.

In the copending application of H. M. Sullivan and R. C. Bransfield, Serial No. 311,194, entitled "Mounting Device," a structure is shown which is capable of taking up stresses produced by horizontal expansion in one direction and vertical expansion of the lines connected to the pump or to the apparatus supported thereby, and the mounting is so constructed that the bed plate can be accurately leveled after the pump has been installed. In accordance with our invention, a mounting is provided capable of taking up stresses produced by a horizontal movement in any direction, and the structure of the leveling device is somewhat simplified and improved.

Accordingly, it is an object of the invention to provide an improved load-supporting mounting device.

It is a further object to provide a mounting device for a pump which is not damaged by vertical expansion or contraction of the lines connected to the pump, or by horizontal expansion or contraction in any direction.

It is a still further object to provide a mounting device which can be rapidly and conveniently leveled after installation of the pump or other piece of heavy apparatus carried thereby.

It is a still further object to provide a mounting device which is reliable in operation, easily adjusted, economical to manufacture, and which has a long life under adverse conditions.

Various other objects, advantages and features of the invention will become apparent from the following detailed description taken in conjunction with the accompanying drawings, in which.

Figure 1:
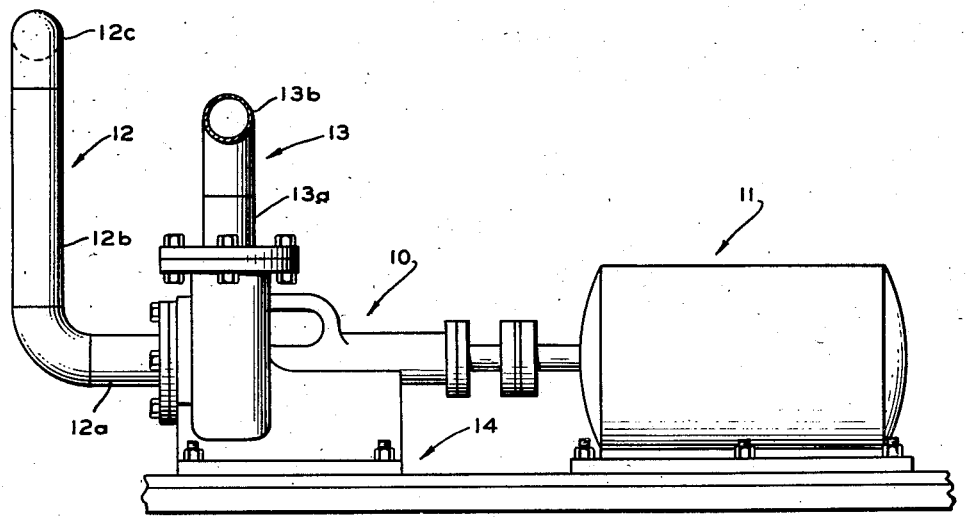
Figure 1 is a side elevational view of a motor-pump assembly.

Referring now to the drawings in detail, I have shown an assembly including a pump 10 and a motor 11, the pump having a suction line 12 and a discharge line 13. Suction line 12 incorporates a portion 12a extending axially of the pump in a horizontal plane, a vertical portion 12b and a horizontal portion 12c extending in a direction generally perpendicular to the horizontal portion 12a. Discharge line 13 includes a vertical portion 13a and a horizontal portion 13b extending in the opposite direction with respect to horizontal portion 12c. It will be noted, therefore, that expansion or contraction of the vertical and horizontal portions of the suction and discharge lines produce stresses upon the mounting device of the pump, which is indicated generally by reference numeral 14. Horizontal stresses in both directions are produced by the relatively perpendicular portions 12a, 12c of the suction line, and vertical stresses are produced by the vertical portions 12b and 13a.

In accordance with this invention, the mounting device is constructed so that limited vertical movement of the support can take place responsive to such stresses as well as limited horizontal movement in any direction, thereby preventing damage to the supporting structure or pump. Further, the pump bed plate can be leveled after the unit has been installed.

Figure 2:
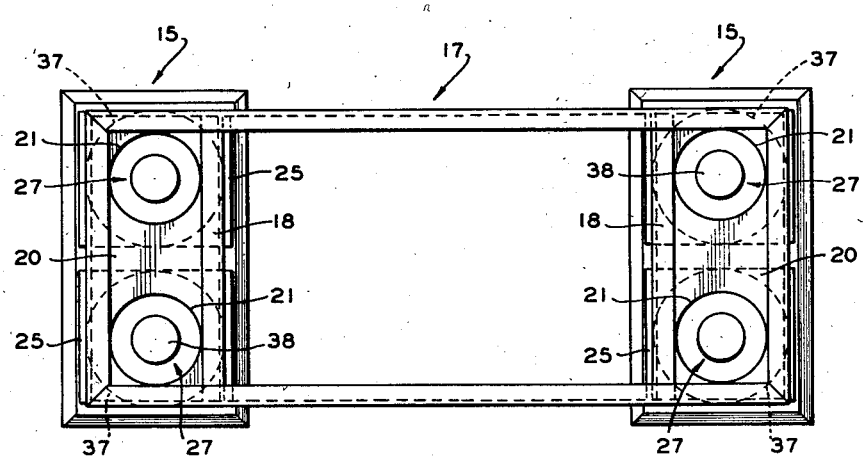
Figure 2 is a top view of a mounting device constructed in accordance with the invention.
Figure 3:
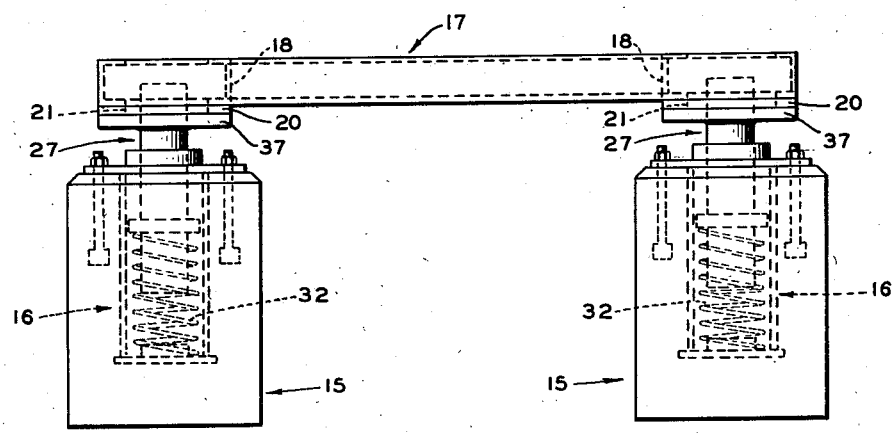
Figure 3 is a front elevational view of the structure of Figure 2.
Figure 4:
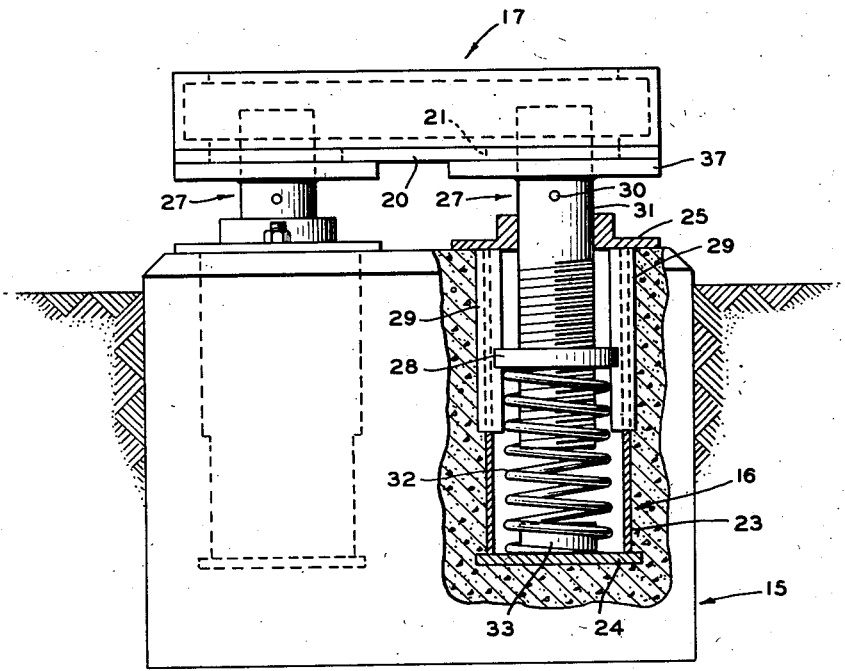
Figure 4 is a vertical sectional view, partially in elevation, of one of the spring mountings.

The detailed structure of the mounting device performing these functions is shown by Figures 2, 3 and 4, and this structure includes a concrete foundation or base 15 within which are imbedded stationary base means 16. Vertically yieldable means, such as spring assemblies, are incorporated in the base means. These spring assemblies carry a load-supporting structure, such as a rectangular frame 17, which is disposed for horizontal movement, to a limited extent, in any direction relative to the stationary base means 16.

It will be noted that frame 17 is formed from U-shaped channel members, and is of generally rectangular construction. It is provided with two horizontally extending channel members or braces 18 adjacent the respective ends thereof, these auxiliary frame members together with the ends of frame 17 supporting the respective metal plates 20 which are welded or otherwise suitably secured thereto. Each plate 20 has two holes or openings 21 formed adjacent the respective ends thereof and overlying the stationary base means 16. The frame 17 and its associated structure can constitute the bed plate of the pump 10, Figure 1. Alternatively and preferably, the frame 17 constitutes a sub-bed plate supporting the main bed plate, not shown, of the pump.

Each of the stationary base means 16 includes a generally cylindrical casing 23 buried beneath the surface of the earth in the concrete foundation 15, the lower end of the casing being closed by an end plate 24. A cover plate 25 is provided to prevent material from entering the casing 23.

An elongated, threaded adjusting rod 27 is mounted in a vertical position within the casing 23 and concentric therewith, the rod carrying a threaded annular disk or flange 28, this flange having a plurality of radially-extending slots disposed about its periphery within which are received a plurality of keys 29. These keys extend vertically, and protrude inwardly through suitable slots formed in the cylindrical casing 23. Accordingly, the keys 29 prevent rotation of the flange 28 but permit axial or longitudinal movement thereof with respect to the rod 27. Consequently, as the rod is rotated, the flange 28 is moved vertically with respect to it along the keys 29. Such rotation of the rod can be effected, for example, by inserting a suitable pin through a diametric bore 30 provided in the top protruding portion 31 of the rod 27.

A helical spring 32 encircles the lower potrion of rod 27 and has its upper end secured to the flange 28. The lower end of the spring is secured to the end plate 24 and encircles an abutment 33 protruding upwardly therefrom.

The upper portion 31 of rod 27 extends through the cap or cover 25 and has secured thereto a support or flange 37 upon which rests the adjacent plate 20, Figures 2 and 4, forming a part of frame 17. The upper end 38 of the rod extends through one of the openings 21 in plate 20, and it will be noted, Figure 2, that the opening 21 is of somewhat larger diameter than the rod 27. In practice, the diameter of the opening can be about four inches greater than the diameter of the rod. It will be evident that this construction permits a two inch movement of the frame 17 relative to the rods 27 in any horizontal direction, responsive to the strains imposed upon the pump by expansion or contraction of the suction and discharge lines 12 and 13.

It will be evident that the weight of the pump is supported by the frame 17 which, in turn, is supported by the flanges 37 and rods 27, the thrust produced by the weight of the pump being transmitted to foundations 15 from the rods 27 by the respective springs 32. The amount of thrust transmitted through each spring 32 is determined by the vertical position of flange 28 which determines the extent of expansion or contraction of the spring. Thus, even when the pump is supported by the mounting device, the amount of thrust transmitted by each spring can be adjusted by rotation of the corresponding rod 27 and consequent relative vertical movement between such rod and its flange 28. Such rotary adjustment of the rod, of course, also changes the elevation or vertical position of the flange 37 secured thereto and thereby raises or lowers the corresponding corner of the pump bed plate. Accordingly, the pump can be leveled after it is installed by suitable rotation of the adjusting rods, as by rods inserted through the bores 30.

It will be evident that the stresses resulting from contraction or expansion of the vertical portions 12b, 13a of the pump suction and discharge lines will be transmitted to the supporting structure and result in a vertical movement thereof, as permitted by the suspending springs 32, rather than resulting in damage to the pump or support as would be the case if the support were rigid vertically. As a corollary to this, the vertical position of each of the four corners of the structure, as defined by the vertical position of flanges 37, can be individually adjusted after the pump and its connections have been installed.

The greater diameter of the openings 21 relative to the diameter of the rods 27 permits movement of the pump relative to the support responsive to horizontal stresses imposed by expansion or contraction of the horizontally extending portions 12a, 12c and 13b of the suction and discharge lines 12 and 13. Consequently, such horizontal stresses do not result in damage to the pump or its associated structure as would be the case if the pump were rigidly mounted.

Finally, it will be noted that the frame 17 is disposed generally at the level of the surface of the earth, i. e. slightly above it, while the spring supports themselves and their associated structure are mounted below the level of the surface of the earth. This keeps to a minimum protruding parts which tend to interfere with maintenance of the pump or other equipment, and permits the mounting height of the supported equipment to be the same as with an ordinary mounting. Although, as indicated, the structure of our invention is particularly suited for pump mounting, it is not restricted thereto, as the structure can be used with any equipment subject to a small movement in any direction. However, when the structure is utilized as a pump support, the low mounting permits more net positive suction head on the pump impeller when pumping from a vessel of fixed height, which oftentimes means the difference between reliable and unreliable pump operation.

The provision of the keys 29 and flange 28 provides a very positive action when the spring support is adjusted, and the unit is very readily dismantled for maintenance or repair due to the novel construction of the spring assemblies. Finally, the spring mounting of our invention is effective in dampening vibration due to the action of the pump or other supported structure.

While the invention has been described in connection with a present, preferred embodiment thereof, it is to be understood that this description is illustrative only and is not intended to limit the invention.

We claim:

1. A mounting device comprising, in combination, a stationary base means, a plurality of spring assemblies carried by said base means, each spring assembly including a vertical threaded adjusting rod, an annular disk threaded to said rod and having at least one radially-extending slot formed in the edge thereof, a generally cylindrical casing surrounding said adjusting rod and having at least one vertically-extending key protruding inwardly therefrom and fitting within the slot on said disk, whereby the disk is constrained against rotation and rotation of the rod causes axial movement of the disk relative to the rod, a helical spring encircling the lower portion of said rod, said spring having one end thereof secured to said stationary base means and the other end thereof secured to said disk, each rod having a support secured at the upper end thereof, a load-supporting frame having a horizontal plate member resting upon each of said supports, said plate members having openings formed therein around the respective rods and of larger diameter than said rods which protrude through the openings but not beyond said frame structure, whereby said frame is adapted for limited horizontal movement in any direction relative to said adjusting rods, and apparatus to be supported carried by said frame structure and overlying said rods.

2. The combination of claim 1 wherein the load-supporting frame is disposed just above the level of the surface of the earth, and wherein said spring assemblies and their associated parts are buried beneath the surface of the earth.

References Cited in the file of this patent

UNITED STATES PATENTS

| 1,203,633 | Kurowski | Nov. 7, 1916 |
|---|---|---|
| 1,491,423 | Rice | Apr. 27, 1924 |
| 1,678,968 | Allen | July 31, 1928 |
| 1,880,280 | Replogle | Oct. 4, 1932 |
| 1,973,187 | Van Sciver | Sept. 11, 1934 |
| 1,986,132 | Bigelow | Jan. 1, 1935 |
| 2,173,342 | Rosenzweig | Sept. 19, 1939 |
| 2,174,209 | Genest et al. | Sept. 26, 1939 |
| 2,175,784 | Rosenzweig | Oct. 10, 1939 |
| 2,456,612 | Baudry | Dec. 21, 1948 |
| 2,468,043 | Crede et al. | Apr. 26, 1949 |
| 2,540,525 | Howarth et al. | Feb. 6, 1951 |

FOREIGN PATENTS

| 16,847 | Great Britain | of 1911 |
|---|---|---|
| 707,308 | Germany | June 18, 1941 |
| 727,537 | Germany | Nov. 5, 1942 |